US009632974B1

(12) United States Patent
Cai et al.

(10) Patent No.: US 9,632,974 B1
(45) Date of Patent: *Apr. 25, 2017

(54) PROXY BASED DATA TRANSFER UTILIZING DIRECT MEMORY ACCESS

(71) Applicant: International Business Machines Corporation, Armonk, NY (US)

(72) Inventors: Junjie Cai, Cary, NC (US); Xin Peng Liu, Beijing (CN); Chuan Sheng Lu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/297,360

(22) Filed: Oct. 19, 2016

Related U.S. Application Data

(63) Continuation of application No. 15/151,521, filed on May 11, 2016, now Pat. No. 9,495,284, which is a continuation of application No. 15/050,720, filed on Feb. 23, 2016, now Pat. No. 9,397,788, which is a continuation of application No. 14/938,244, filed on Nov. 11, 2015.

(51) Int. Cl.
*G06F 15/167* (2006.01)
*G06F 15/173* (2006.01)
*H04L 29/08* (2006.01)
*H04L 29/06* (2006.01)

(52) U.S. Cl.
CPC .... *G06F 15/17331* (2013.01); *H04L 65/1069* (2013.01); *H04L 67/10* (2013.01)

(58) Field of Classification Search
CPC ................................ H04L 1/08; H04L 1/0057

USPC .......................................................... 709/213
See application file for complete search history.

(56) References Cited

U.S. PATENT DOCUMENTS

| 6,754,709 B1* | 6/2004 | Gbadegesin | ............ H04L 29/06 |
| | | | 709/227 |
| 7,103,671 B2 | 9/2006 | Quiggle et al. | |
| 7,600,217 B2 | 10/2009 | Dostert et al. | |
| 7,991,839 B2 | 8/2011 | Freimuth et al. | |
| 8,024,469 B1 | 9/2011 | Allen et al. | |

(Continued)

OTHER PUBLICATIONS

Chen et al., "Fast Proxy Delivery of Multiple Streaming Sessions in Shared Running Buffers", IEEE Transactions on Multimedia, vol. 7, No. 6, Dec. 2005, pp. 1157-1169.
Lee, "SOCKS: A protocol for TCP proxy across firewalls", OpenSSH, Printed on: Jul. 20, 2015, 2 pages, <http://www.openssh.com/txt/socks4.protocol>.

(Continued)

*Primary Examiner* — Anthony Mejia
(74) *Attorney, Agent, or Firm* — Daniel R. Simek

(57) ABSTRACT

A method for transferring data utilizing direct memory access. The method includes a computer processor establishing a networking connection, using a proxy, between at least a first computing entity and a second computing entity. The method further includes determining a shared memory space for the established networking connection between at least the first computing entity and the second computing entity. The method further includes allocating the shared memory space from heap memory. The method further includes transmitting data over the established networking connection between at least the first computing entity and the second computing entity utilizing a direct memory access protocol and the allocated shared memory space.

1 Claim, 5 Drawing Sheets

(56) References Cited

U.S. PATENT DOCUMENTS

| | | | | |
|---|---|---|---|---|
| 2002/0066022 | A1* | 5/2002 | Calder | G06F 21/121 726/26 |
| 2005/0132367 | A1* | 6/2005 | Tewari | G06F 9/5077 718/1 |
| 2009/0070776 | A1 | 3/2009 | Dahlstedt | |
| 2009/0083756 | A1 | 3/2009 | Kim et al. | |
| 2011/0231651 | A1* | 9/2011 | Bollay | H04L 63/166 713/152 |
| 2011/0264841 | A1 | 10/2011 | Duimovich et al. | |
| 2011/0276705 | A1* | 11/2011 | Stokking | H04L 65/1069 709/228 |
| 2013/0262801 | A1* | 10/2013 | Sancheti | G06F 3/065 711/162 |
| 2013/0290596 | A1 | 10/2013 | Corrie | |
| 2015/0236819 | A1* | 8/2015 | Zhovnirnovsky | H04L 1/08 370/216 |
| 2015/0277995 | A1* | 10/2015 | Raju | G06F 9/545 719/313 |
| 2015/0281112 | A1* | 10/2015 | Raju | G06F 9/45533 709/226 |

OTHER PUBLICATIONS

Leech et al., "SOCKS Protocol Version 5", Internet Engineering Task Force (IETF), Network Working Group, Standards Track, Mar. 1996, Printed on: Jul. 20, 2015, pp. 1-9, <https://www.ietf.org/rfc/rfc1928.txt>.

Li et al., "NUMA-Aware Shared-Memory Collective Communication for MPI", HPDC'13, Jun. 17-21, 2013, New York, NY, USA, Copyright 2013 ACM, pp. 85-96.

"Java Application Isolation API", Package javax .isolate, Printed on: Jul. 21, 2015, 4 pages.

"Loopback", webopedia, Printed on: Jul. 21, 2015, 2 pages, <http://www.webopedia.com/TERM/L/loopback.html>.

List of IBM Patents or Patent Applications Treated as Related, Appendix P, 2 pages, Filed Herewith.

Cai, et al., "Proxy Based Data Transfer Utilizing Direct Memory Access", U.S. Appl. No. 14/938,244, filed Nov. 11, 2015.

Cai, et al., "Proxy Based Data Transfer Utilizing Direct Memory Access", U.S. Appl. No. 15/050,720, filed Feb. 23, 2016.

Cai, et al., "Proxy Based Data Transfer Utilizing Direct Memory Access", U.S. Appl. No. 15/151,521, filed May 11, 2016.

* cited by examiner

PROXY BASED DATA TRANSFER UTILIZING DIRECT MEMORY ACCESS

BACKGROUND OF THE INVENTION

The present invention relates generally to the field of data transfer within virtualized computing environments, and more particularly to data transfer within a computing node by directly utilizing shared system memory.

In system virtualization, each computing entity behaves as if it were a separate computer; information and data are transferred (e.g., communicated) utilizing computer networking. Some virtualized systems permit a VM to support multitenancy of a runtime environment or a shared container in a cloud computing application. In some virtualized systems, each tenant (e.g., application) may be treated as a computing entity. In computer networking, the transport layer provides end-to-end communication services for applications within a layered architecture of network components and protocols. The transport layer provides convenient services, such as application programming interfaces (APIs), connection-oriented data stream support, reliability, flow control, socket creation, socket closing, data transmission, and multiplexing. Computing entities within a virtualized system and entities external to a virtualized system may utilize a proxy server or a proxy application to process communications between computing entities.

Communication between applications within the same virtualized system progresses through a networking software stack associated with a first application and another networking software stack for the second application. Alternatively, a modification of an infrastructure, such as a Virtual Machine Communication Interface (VMCI) protocol, provides fast (e.g., low latency) and efficient (e.g., high bandwidth) communication between a virtual machine and the host operating system and between two or more virtual machines and/or applications executing on the same host (i.e., the same physical real computer).

SUMMARY

Aspects of an embodiment of the present invention disclose a method, computer program product, and computing system for communicating data utilizing direct memory access. In an embodiment, the method includes one or more processors establishing a networking connection, using a proxy, between at least a first computing entity and a second computing entity. The method further includes one or more processors determining a shared memory space for the established networking connection between at least the first computing entity and the second computing entity. The method further includes one or more processors allocating the shared memory space from heap memory. The method further includes one or more processors transmitting data over the established networking connection between at least the first computing entity and the second computing entity utilizing a direct memory access protocol and the allocated shared memory space.

DETAILED DESCRIPTION

Figure 1:
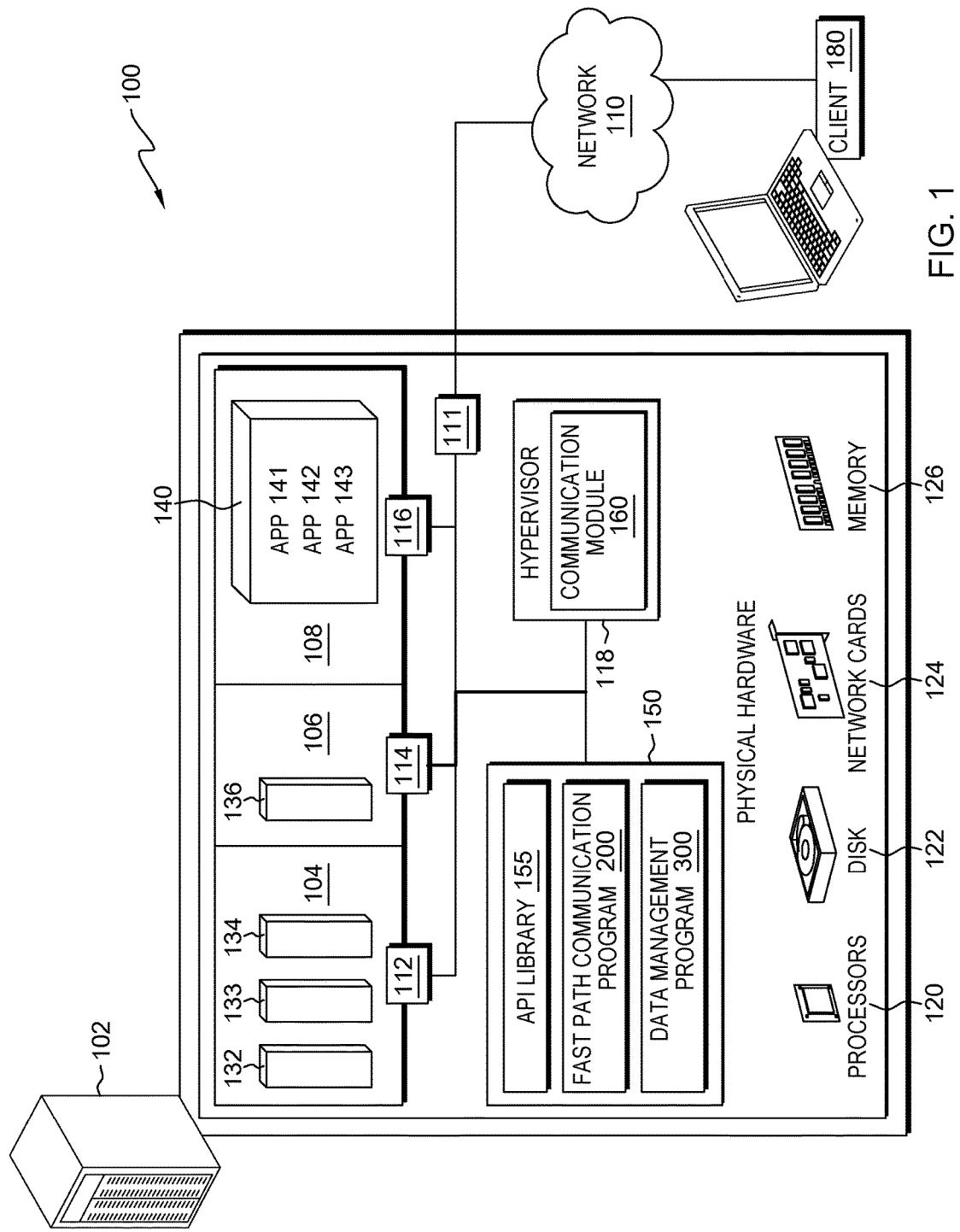
FIG. 1 illustrates a virtualized computing environment, in accordance with an embodiment of the present invention.

Embodiments of the present invention recognize that transferring data and information within a computing node (e.g., a physical machine) of a virtualized computing environment may slow due to various implementations of network communication. For example, communications between processes (e.g., applications) within a virtualized computing environment can invoke a network application programming interface (API) defined within a runtime library of a programming language. An API can interact with the operating system kernel, which in turn accesses the transmission control protocol (TCP) stack. A similar series of events occurs for a second application that transfers data with the first application since the data transfer is treated as network communication. Multi-layered overhead (e.g., increased latency, additional system resources utilized, etc.) may occur among computing entities, herein identified as entities. Entities may include: software applications, processes, VMs, tenant applications, threads, tasks, etc. executing within the same computing node. Additional overhead may be added if a computing entity utilizes a proxy server or proxy application to facilitate the network communication to another computing entity. A proxy acts as an intermediary for requests from clients (e.g., computers, servers, programs, etc.) seeking resources from other servers (e.g., computers, programs, entities, etc.).

Embodiments of the present invention recognize that various virtualized computing environments provide shortcuts (e.g., VMCI protocol, VMCI API, etc) for communicating between VMs of the same computing node. Embodiments of the present invention also recognize that various operating systems provide shortcuts for the networking sockets within one OS. A network socket is an endpoint of an inter-process communication across a computer network. One such shortcut permits the data/information (e.g., object) that is exchanged to be copied from user mode to kernel mode. Embodiments of the present invention recognize that applications written utilizing various software languages and software development kits (SDKs) may utilize remote direct memory access (RDMA) operations that support zero-copy networking to transfer data directly to or from application memory. A RDMA operation eliminates the need to copy data between application memory and the data buffers of an OS executing on the same physical computing node. However, when computing entities utilize a proxy application or proxy server to communicate, RDMA operations occur between each computing entity and the proxy as opposed to RDMA operations occurring between the communicating computing entities.

Some embodiments of the present invention utilize TCP and a socket registry. Various embodiments of the present invention utilize a proxy to establish communications (e.g., network communications) between computing entities, such as a socket secure (SOCKS) session. Computing entities may utilize a proxy for, but not limited to: access control, content control (e.g., filtering), load balancing, security (e.g., encryption, certificates), encapsulation, etc. Some embodiments of the present invention create, utilize, and update tables herein identified as global socket registry tables that identify the endpoints (e.g., host name, identity information, Internet protocol (IP) address, process number, port number, etc.) of a communication path of the computing entities. Some embodiments of the present invention may utilize user datagram protocol (UDP) or another networking protocol. Embodiments of the present invention initiate modifications within a transport layer (e.g., TCP, UDP) and do not affect authentication mechanisms related to SOCKS5.

Embodiments of the present invention allocate memory (e.g., blocks, buffers, etc.) from a heap (e.g., unallocated memory) of a computing node, such that one or more direct memory access methods (e.g., RDMA, a fast path communication solution, etc.) may be utilized to communicate data between computing entities. Embodiments of the present invention enable a proxy application or proxy server, herein identified as a proxy, to manage a read pointer and a write pointer pair (RWP) corresponding to data communicated via direct memory access (e.g., transfer).

One embodiment of the present invention may allocate a shared memory buffer for each instance of data communicated between computing entities. Some embodiments of the present invention may utilize a proxy that enables data communications among a plurality of entities (e.g., shared socket connections). Other embodiments of the present invention may combine RWP pairs such that multiple read pointer and write pointers manage the data communication within a shared memory buffer. In one example, one entity may write data to a shared memory buffer, and no subsequent data is written to the shared memory buffer until each reading entity consumes the written data. The number and locations (e.g., within a VM, within a LPAR, between LPARs) of entities that communicate data via a proxy may be affected by: the architecture of a computing node, a hypervisor (e.g., firmware, software) of the computing node, and/or communication functions incorporated within the computing node.

An embodiment of the present invention may allocate a block of memory comprised of a plurality of buffers to a message sharing pool. In such an embodiment, each socket connection pair (e.g., client↔proxy↔server) is assigned an unused messaging buffer of a message sharing pool. In addition, a proxy manages a read pointer assigned to the designated buffer that allows writing new messages (e.g., data) into the designated buffer and read out of the designated buffer as the data consumed. Subsequently, when a socket connection pair disconnects, the buffer (e.g., shared memory) may be returned to a message sharing pool. Various embodiments of the present invention may utilize a plurality of read pointer and write pointer pairs to communicate (e.g., transmit) data (e.g., multiple data records) via a buffer within the allocated shared memory. Some embodiments of the present invention may dynamically allocate the size of a buffer within a messaging pool based on the size of the data and/or dictates associated with communicating entities.

Some embodiments of the present invention modify the implementation codes (e.g., APIs, methods, etc.) for network communications for a supported language runtime environment networking (e.g., socket creation, port identification, etc.) to support shared heap space for data transfer (e.g., a fast path communication solution). Utilizing modified implementation codes (e.g., alternative API) and the shared heap space for data exchange, embodiments of the present invention may accelerate communications between applications and reduce method invocations. Other embodiments of the present invention may detect a native networking API invocation and redirect a network communication method to initiate an alternative API. An embodiment of the present invention may affect the creation of sockets via the network connection management code of the SDK. Such an embodiment of the present invention may dictate modifying the source code of an application and/or recompiling an application to utilize the fast path communication solution.

Other embodiments of the present invention may be implemented at the application layer as opposed to the transport layer. For example, a hypertext transfer protocol (HTTP) proxy and/or a HTTP over secure socket layer (HTTPS) proxy may be utilized by computing entities that engage in web-based and/or Internet-like transfers of data. Alternative embodiments of the present invention may be based on various web protocols that utilize TCP as a basis for network connections.

Various embodiments of the present invention determine whether the computing entities (e.g., applications) that communicate data execute within the same physical computing node, and if so, transfer the data (e.g., object) via direct memory access (e.g., reducing latency). However, the dynamic nature of memory management within a virtualized computing environment may move data or reclaim/reallocate memory space. For example, some programming languages may rely on a system function, such as a garbage collector, to free (e.g., de-allocate) shared memory after data is communicated (e.g., consumed). Other programming languages may explicitly release shared memory utilized to communicate data when: a call, a method, a function, etc. finalizes (e.g., completes, terminates, etc.). Some embodiments of the present invention may incorporate additional controls to protect the address locations and memory space allocated for the transfer of data until an application has consumed the data (e.g., an object) and flagged the data as "dead" (e.g., unneeded, consumed, released). For example, an object may be designated as "dead" when: the object is not utilized by an executing application, the object is not referenced by an executing application, and the object is "finalized" by a method function within an executing application. In another example, consumed data may remain in a protected condition in shared memory when the data is cached for reuse.

The present invention will now be described in detail with reference to the Figures. FIG. 1 is a functional block diagram illustrating a networked computing environment 100, which includes computing node 102 (i.e., a virtualized computing system), network 110, and client 180, in accordance with the present invention.

Client 180 may be: a laptop computer, a tablet computer, a netbook computer, a personal computer (PC), a desktop computer, a personal digital assistant (PDA), a smart phone, a wearable device (e.g., digital eyeglasses, smart glasses, smart watches, personal fitness devices, personal safety devices), or any programmable computer system known in the art. In certain embodiments, computing node 102 and client 180 represents a computer system utilizing clustered computers and components (e.g., database server computers, application server computers, etc.) that act as a single pool of seamless resources when accessed through network 110, as is common in data centers and with cloud-computing applications. In general, computing node 102 and client 180 are representative of any programmable electronic device or combination of programmable electronic devices capable of executing machine readable program instructions and communicating with users of computing node 102 and client 180, via network 110. Computing node 102 and client 180 may include components, as depicted and described in further detail with respect to FIG. 5, in accordance with embodiments of the present invention.

In an embodiment, computing node 102 is divided into multiple partitions that include logical partitions (LPARs) 104, 106, and 108. In an illustrated example for computing node 102, LPAR 104, LPAR 106, and LPAR 108 each run an independent operating environment, such as an operating system (OS). In some embodiments, LPAR 104 includes VM 132, VM 133, and VM 134 executing a shared OS. LPAR 106 includes VM 136 executing another OS. LPAR 108 includes VM 140 executing another OS capable of multitenancy of applications. In this instance, VM 140 includes app 141, app 142, and app 143 (e.g., multitenancy). In other embodiments, LPAR 104, LPAR 106, and LPAR 108 may include a different number of provisioned VMs. In further embodiments, LPAR 104, LPAR 106, and LPAR 108 may include other operating environments and combinations of operating environments. In various embodiments, computing node 102 is a node of a clustered computer system, such as a cloud computer.

Communications to and from network 110 are routed through shared Ethernet adapter (SEA) 111 to virtual adapters 112, 114, and 116 on respective LPARs 104, 106, and 108, in accordance with an embodiment of the present invention. In an embodiment, SEA 111 is comprised of one or more network cards 124 controlled by hypervisor 118. In another embodiment, SEA 111 is associated with an LPAR (not shown) executing an OS, such as a virtual input/output (I/O) server (VIOS). In an alternative embodiment, physical network adapters are allocated to LPARs 104, 106, and 108.

Hypervisor 118 forms LPAR 104, LPAR 106, and LPAR 108 from the physical resources (e.g., hardware) of computing node 102. The physical hardware of computing node 102 is comprised of: processors 120, disk 122, network cards 124, and/or memory 126, which may be allocated (e.g., provisioned) to LPAR 104, LPAR 106, and LPAR 108. Hypervisor 118 performs standard operating system functions and manages communication between LPAR 104, LPAR 106, and LPAR 108 via an internal network. In one embodiment, communications within computing node 102 are provided by a virtual local area network (VLAN). In some embodiments, computing node 102 may utilize other technologies, such as VMCI or virtual network interface cards (VNIC), to enhance the communications with virtual adapters 112, 114, and 116 or to replace virtual adapters 112, 114, and 116.

Communication module 160 is associated with hypervisor 118 and includes look-up tables to track various communication protocols, port numbers, and socket addresses utilized to communicate between various computing entities. In some embodiments, communication module 160 includes look-up tables (e.g., global socket registry tables) identifying the real TCP connections utilized by the communication solution between the computing entities. In an alternative embodiment, communication module 160 includes tables that are associated with a fast path communication solution and are identified herein as: SharedVM_FPath, SharedOS_FPath, and SharedHypervisor_FPath. SharedVM_FPath communication solution utilizes one or more shared memory buffers allocated from heap associated with a VM. SharedOS_FPath communication solution utilizes one or more shared memory buffers allocated from heap associated with a LPAR. SharedHypervisor_FPath communication solutions utilizes one or more shared memory buffers allocated from heap associated with computing node 102.

In addition, communication module 160 may interact with a memory management function (not shown) that manages (e.g., allocates, protects, releases, etc.) memory associated with the heap and/or shared memory buffers. In some embodiments, communication module 160 creates, provisions, and manages proxies executing within computing node 102 that enable entities to communicate data.

In some embodiments, computing node 102 communicates through network 110 to client 180, other computing nodes (not shown) within networked computing environment 100, other virtualized computing environments (not shown), and other computers (not shown). Network 110 can be, for example, a local area network (LAN), a telecommunications network, a wireless local area network (WLAN), a wide area network (WAN), such as the Internet, or any combination of the previous, and can include wired, wireless, or fiber optic connections. In general, network 110 can be any combination of connections and protocols that will support communications between processors 120 and computing node 102, in accordance with embodiments of the present invention. In another embodiment, network 110 operates locally via wired, wireless, or optical connections and can be any combination of connections and protocols (e.g., NFC, laser, infrared, etc.). In some embodiments, a physical computer, such as computing node 102 is identified by a media access control address (MAC address), which is a unique identifier assigned to network interfaces for communications on the physical network segment.

DMA proxy module 150 includes API library 155, fast path communication program 200, and data management program 300. DMA proxy module 150 may include shareable memory functions (not shown) and communication functions (not shown) that respond to embodiments of the present invention to generate the interaction that produce the fast path communication solution (e.g., a path). For example, communication controls, such as send/receive locks, ensure correct read/write sequencing of shared heap memory space, which is shared by different threads. In some embodiments, DMA proxy module 150 includes one or more global socket registry tables, such as: a SharedVM_FPath table, a SharedOS_FPath table, and a SharedHypervisor_FPath table.

API library 155 includes one or more networking APIs coded for each runtime environment and/or software language to enable a direct memory transfer (e.g., zero copy operation) of data among computing entities, in accordance with embodiments of the present invention. In one embodiment, API library 155 includes modified networking APIs that enable direct memory transfer of data that subsequently replace native networking APIs, such as networking APIs related to a runtime environment. In other embodiment, API library 155 includes modified networking APIs that are invoked in response to a function call of a software application.

Fast path communication program 200 identifies computing entities executing within networked computing environment 100 that are engaged in data communication (e.g., data transmission, date exchange). In one embodiment, fast path communication program 200 identifies a location (e.g., computing node 102, client 180) for each computing entity engaged in data communication. In addition, fast path communication program 200 determines which computing entities utilize a proxy to enable communications. In another embodiment, fast path communication program 200 determines a direct memory transfer protocol that is utilized by computing entities that communicate data. In various embodiments, fast path communication program 200 allocates heap memory that is utilized for direct memory transfer of data between computing entities. In some embodiments, fast path communication program 200 interfaces with data management program 300. In other embodiments, multiple instances of fast path communication program 200 and data management program 300 execute to enable direct memory transfer of data among a plurality of computing entities that communicate.

Data management program 300 determines information that is associated with communicated data, such as a size of the data, one or more controls related to the data, a status of the data, etc. In one embodiment, data management program 300 may also apply one or more controls to communicated data that prevents a memory management function of computing node 102 from affecting a shared memory that stores the communicated data. In another embodiment, data management program 300 determines a status for communicated data and manages the shared memory based, at least in part, on the status of the communicated data. In various embodiments, data management program 300 manages shared memory utilized to communicate data between entities by interfacing with a proxy; where the proxy manages a read pointer and a write pointer pair that corresponds to the data that is communicated between entities.

In some embodiments, multiple instances of data management program 300 execute concurrently. In an embodiment, one instance of data management program 300 executes and interfaces with one instance of fast path communication program 200. In another embodiment, a plurality of instances of data management program 300 execute and interface with an instance of fast path communication program 200. In an embodiment, an instance of data management program 300 manages one or more read pointer and write pointer pairs of a proxy. In another embodiment, data management program 300 manages a plurality of read pointer and write pointer pairs associated with two or more proxies.

Figure 2:
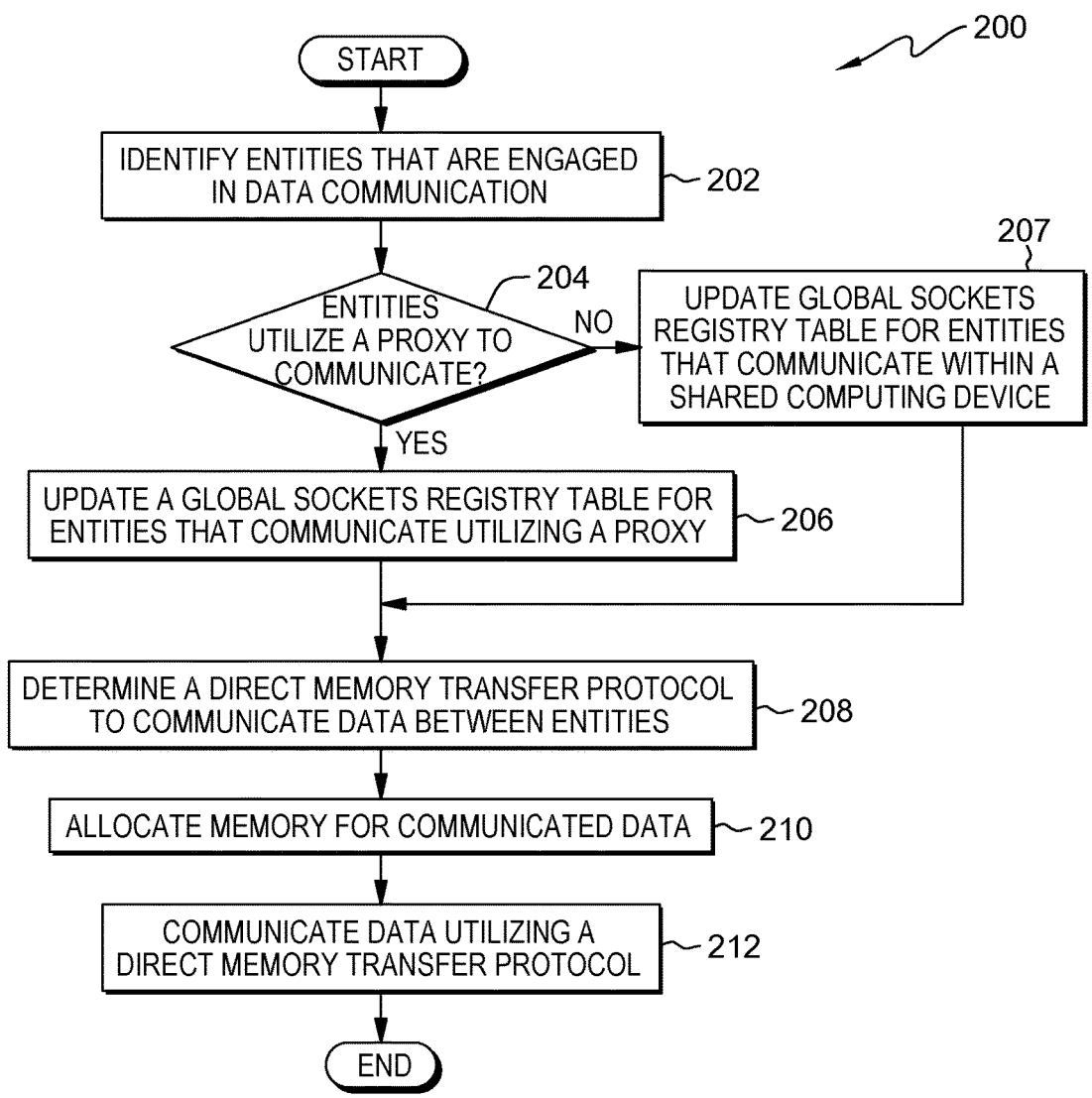
FIG. 2 depicts a flowchart of steps of a fast path communication program, in accordance with an embodiment of the present invention.

FIG. 2 is a flowchart depicting operational steps for fast path communication program 200 executing within computing node 102 within networked computing environment 100 of FIG. 1. In one embodiment, fast path communication program 200 determines which computing entities (e.g., applications, tenants, virtual machines, clients, etc.) executing within computing node 102 may engage in direct-memory data communications, as opposed to kernel based communication or communications that utilize the networking software stack. In one example, fast path communication program 200 determines whether computing entities executing within computing node 102 may engage in application-level data exchange by analyzing which OSs and SDKs are associated with the computing entities and whether the OSs and SDKs include APIs and utilities needed to enable a fast path communication solution. In some embodiments, fast path communication program 200 utilizes one or more APIs of API library 155 that replaces and/or overrides APIs of runtime environments and/or programming languages such that a direct memory transfer (e.g., fast path communication) protocol is utilized.

In step 202, fast path communication program 200 identifies entities that engaged in data communication. In an embodiment, fast path communication program 200 identifies two or more entities that are engaged in data communication within networked computing environment 100. In one embodiment, fast path communication program 200 identifies a corresponding location of each computing entity that engages in data communication. In one scenario, fast path communication program 200 identifies a location for a communicating entity based on information within one or more table related to a global sockets registry. In another scenario, fast path communication program 200 identifies a location for a communicating entity based on information obtained by communication module 160.

In some embodiments, fast path communication program 200 identifies which communicating entities exist within computing node 102. In other embodiments, fast path communication program 200 identifies which communicating entities (e.g., client 180) communicate with computing node 102 via network 110. In various embodiments, fast path communication program 200 additionally identifies relationships among entities, such as entities that communicate within a shared VM (e.g., app 141 and app 143); entities that communicate within a shared OS (e.g., LPAR), such as VMs 132, 133, and 134; and entities that communicate within computing node 102 (e.g., between different LPARs), such as VM 136 and app 142. In addition, fast path communication program 200 may determine which entities that communicate data utilize a proxy to communicate the data.

In decision step 204, fast path communication program 200 determined whether the entities utilize a proxy to communicate. In response to determining that entities utilize a proxy to communicate (Yes branch, decision step 204), fast path communication program 200 updates a global sockets registry table for entities that communicate utilizing a proxy (step 206).

In step 206, fast path communication program 200 updates a global sockets registry table for entities that communicate utilizing a proxy. In one embodiment, fast path communication program 200 updates a global sockets registry table to include a flag that identifies entities that utilize a proxy to communicate within computing node 102. In another embodiment, fast path communication program 200 updates a global sockets registry table to include a different flag that identifies entities that utilize a proxy to communicate via network 110.

Referring to decision step 204, responsive to determining that entities do not utilize a proxy to communicate (No branch, decision step 204), fast path communication program 200 updates a global sockets registry table for entities that communicate utilizing a proxy (step 207).

In step 207, fast path communication program 200 updates a global sockets registry table for entities that communicate within a shared computing device. In an embodiment, fast path communication program 200 updates a global sockets registry table based on the identification of entities that communicate within computing node 102.

In step 208, fast path communication program 200 determines a direct memory transfer protocol to communicate data between entities. In one embodiment, fast path communication program 200 determines a direct memory transfer protocol for entities that communicate utilizing a proxy. In an example, fast path communication program 200 may determine, based on one or more global socket registry tables, that one of the following direct memory transfer protocols is utilized: SharedVM_FPath, a SharedOS_FPath, and a SharedHypervisor_FPath. In one scenario, fast path communication program 200 selects SharedVM_FPath as the direct memory transfer protocol for entities that communicate within a shared VM, such as app 141 and app 142. In another scenario, fast path communication program 200 selects SharedOS_FPath as the direct memory transfer protocol for entities that communicate within a shared OS, such as VM 132 and VM 134.

In another scenario, fast path communication program 200 selects SharedHypervisor_FPath as the direct memory transfer protocol for entities that communicate within a shared physical machine (e.g., computing node 102). In one example, fast path communication program 200 selects SharedHypervisor_FPath to communicate data between entities (e.g., VM 133 and VM 136) within LPARs (e.g., LPAR 104 and LPAR 106) executing different operating systems, such as AIX® and LINUX®. In another example, fast path communication program 200 selects SharedHypervisor_FPath to communicate data between entities (e.g., VM 136 and VM 140) within different LPARs (e.g., LPAR 106 and LPAR 108) executing a different instance of the same OS.

In an alternative embodiment, fast path communication program 200 determines a direct memory transfer protocol for entities that communicate data without utilizing a proxy based on information within one or more global socket registry tables.

In step 210, fast path communication program 200 allocates memory for communicated data. In some embodiments, fast path communication program 200 allocates memory for a shared memory buffer based on information (e.g., size) associated with the identified data (referring to FIG. 3, step 302). In another embodiment, fast path communication program 200 allocates memory for communicated data based on one or more constraints and/or dictates. In one scenario, fast path communication program 200 determines that one or more parameters are associated with a LPAR that constrains a minimum size of heap memory. For example, LPAR 104 is provisioned with 12 GB of memory, and the maximum memory utilization of VM 132, VM 133, and VM 134 is 11.5 GB. Fast path communication program 200 is constrained to allocate a total 0.5 GB of memory among one or more shared memory buffers. In another example, referring to FIG. 4, proxy 401 utilizes a messaging pool to communicate data. Proxy 401 may dictate that each messaging pool buffer (MPB) is 200 MB. If proxy 401 creates three MPBs, then fast path communication program 200 allocates a minimum of 600 MB of memory to shared memory (SM) buffer 408.

In one embodiment, if fast path communication program 200 selects a SharedVM_FPath communication protocol, then fast path communication program 200 allocates memory from heap associated with a VM (e.g., VM 140). In another embodiment, if fast path communication program 200 selects a SharedOS_FPath communication protocol, then fast path communication program 200 allocates memory from heap associated with a LPAR (e.g., LPAR 104). In another embodiment, if fast path communication program 200 selects a SharedHypervisor_FPath communication protocol, then fast path communication program 200 allocates memory from heap associated with computing node 102.

In a further embodiment, fast path communication program 200 may allocate more memory to a SM buffer than is utilized for the communication of a data. In one scenario, fast path communication program 200 allocates a larger SM buffer to enable substantially concurrent, bidirectional communication of data between entities. In another scenario, fast path communication program 200 allocates a larger SM buffer to enable entities that communicate via proxies and entities that communicate directly to utilize a SM buffer.

Figure 3:
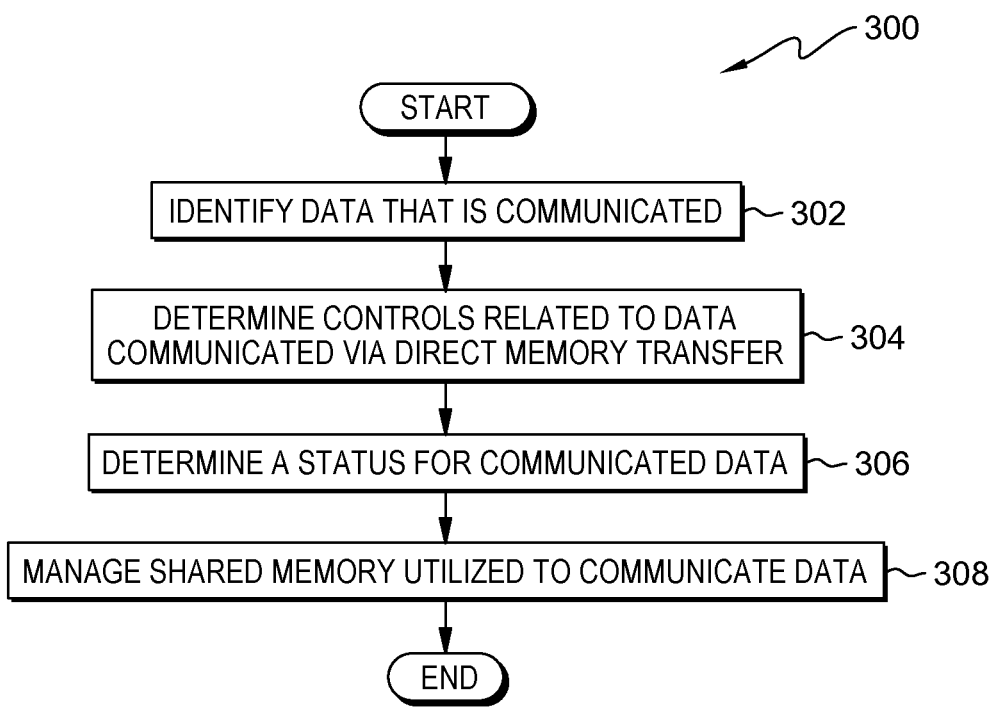
FIG. 3 depicts a flowchart of steps of a memory management program, in accordance with an embodiment of the present invention.

In step 212, fast path communication program 200 communicates data utilizing a direct memory transfer protocol. In one embodiment, fast path communication program 200 communicates data between entities utilizing a direct memory transfer protocol, such as SharedVM_FPath, a SharedOS_FPath, and a SharedHypervisor_FPath. In another embodiment, fast path communication program 200 interfaces with data management program 300 to enable one or more aspects of a direct memory transfer protocol. In one example, fast path communication program 200 may communicate data larger than the memory that is allocated to a SM buffer. Referring to FIG. 3 step 308, fast path communication program 200 may interface with data management program 300 to manage the shared memory that communicates the data between entities. In another example, fast path communication program 200 may interface with data management program 300 to determine that data is cached within a SM buffer. The cached data may be directly read from the SM buffer as opposed to communicating a networking request for the data to the other entity and the other entity communicating the data to the SM buffer.

FIG. 3 is a flowchart depicting operational steps for data management program 300, executing on computing node 102 within networked computing environment 100 of FIG. 1. Data management program 300 determines information that is associated with communicated data, such as a size of the data, one or more controls related to the data, a status of the data, etc. In addition, data management program 300 manages shared memory that is utilized to communicate data via a direct memory transfer protocol.

In step 302, data management program 300 identifies data that is communicated. In one embodiment, data management program 300 identifies data that is communicated between two entities. In one scenario, data management program 300 identifies the data that is communicated between two entities that utilize a proxy to establish a networked connection. In another scenario, data management program 300 identifies the data that is communicated between two entities that do not utilize a proxy to establish a networked connection. In some embodiments, data management program 300 determines information related to communicated data, such as a size of the data, whether the data is cached, whether the data is shared (e.g., multiple receiving entities), a priority assigned to the data, and whether the proxy affected (e.g., encrypted, certified, etc.) the data. In another embodiment, data management program 300 may determine that the identified data is utilized by two or more entities. In an example, referring to FIG. 1, VM 133 may perform a database query and obtain a result. Subsequently, VM 132 and VM 134 include applications that process some or all of the obtained result. In this example, a proxy managing the communication among VM 132, VM 133, and VM 134 may utilize two or more RWPs to communicate the result via a shared memory buffer from VM 133 to VM 132 and VM 134 respectively.

In step 304, data management program 300 determines controls related to data communicated via direct memory transfer. In one embodiment, data management program 300 determines that communicated data is cached. In one scenario, data management program 300 may set a flag in the header of the communicated data indicating that the data is cached and is not deleted and/or memory addresses released when the data is communicated (e.g., used, consumed). In another scenario, data management program 300 communicates with a memory management program of hypervisor 118 that the data within a SM memory is cached. In another embodiment, data management program 300 communicates with a memory management program (e.g., a garbage collector) of hypervisor 118 that the data within a SM memory buffer is protected (e.g., not moved to another memory address, memory is not released).

In some embodiments, data management program 300 obtains controls related to data communication from a proxy managing the networking and/or data communication (e.g., transfer) between entities. For example, data management program 300 may determine in step 302 that the communicated data is segmented (e.g., larger than an allocated shared memory buffer) and that read/write locks are utilized for data communication. In another example, data management program 300 may determine that two or more entities may access the same data within a shared memory buffer concurrently. Therefore, data management program 300 determines that the shared memory buffer is protected until the two or more entities each obtain the shared data. In other embodiments, data management program 300 obtains controls related to data communication from an entity (e.g., software, API, etc.) engaged in communicating the data. In an example, data management program 300 may determine that app 141 is coded in a language that explicitly releases memory when data communication is complete.

In step 306, data management program 300 determines a status for a communicated data. In one embodiment, data management program 300 determines whether the communication of the data between entities is successful. In some embodiments, data management program 300 determines status information related to an in-progress communication of data. In an example, data management program 300 may determine a completion percentage for a data communication. In another example, data management program 300 may determine which blocks of memory, that comprise a shared memory buffer, are communicated and which blocks of memory remain in a queue. In other embodiments, data management program 300 may pause at step 306 until a status changes for a communicated data. In another embodiment, data management program 300 determines whether data is flagged as "cached." In an alternative embodiment, data management program 300 determines a status based on analyzing exception information received from a proxy and/or a communicating entity.

In step 308, data management program 300 manages shared memory utilized to communicate data. In one embodiment, data management program 300 may manage communication controls, such as send/receive locks ensure correct read/write sequencing of shared heap memory space, which is shared by communicating entities. In another embodiment, data management program 300 releases shared memory when data is consumed and/or a network connection terminates. In an alternative embodiment, data management program 300 may utilize information associated with the data (step 302) to determine which buffer contains data of a lower priority. In case of an emergency (e.g., constrained shared memory), a memory buffer associated with a lower priority data and/or process may be purged and the memory buffer assigned to higher priority data. In one scenario, data management program 300 interfaces with fast path communication program 200 to resume communication of the low priority data based on the state of a corresponding RWP from a point in time of the emergency buffer purge. In another scenario, data management program 300 interfaces with fast path communication program 200 to update a global socket registry table associated with the low priority data such that the low priority data is communicated via a standard network (e.g., TCP) communication path.

Figure 4:
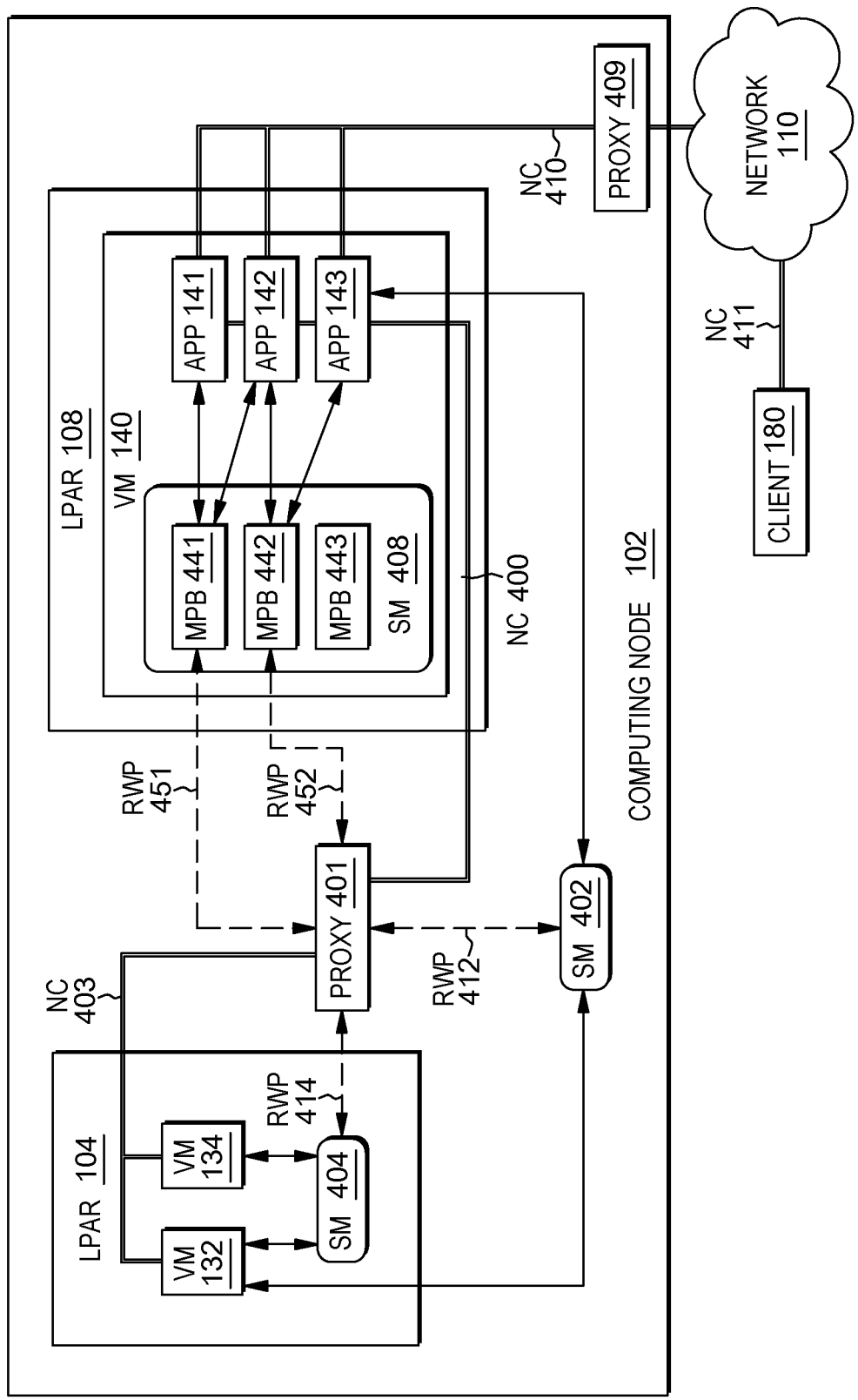
FIG. 4 depicts an illustrative example of proxies managing a plurality of networked communications and related shared memory buffers, enabling communication of data among entities, utilizing a direct memory transfer protocol, in accordance with an embodiment of the present invention.

FIG. 4 is an illustrative example of a proxy enabling network connections among communicating entities and managing the corresponding shared memory that is utilized to communicate data among the entities of computing node 102, in accordance with an embodiment of the present invention.

FIG. 4 includes computing node 102, network 110, and client 180 (each previously discussed in FIG. 1). Computing node 102 includes LPAR 104 and LPAR 108 (each previously discussed in FIG. 1), proxy 401, and proxy 409. In addition, computing node 102 includes various shared memory (SM) buffers that are allocated from Heap memory, a portion of physical memory 126 (previously discussed in FIG. 1). In one embodiment, computing node 102 includes SM 402, allocated by fast path communication program 200 (referring to FIG. 2, step 210). A fast path communication solution (e.g., SharedHypervisor_FPath) utilizes SM 402 to communicate data between entities (e.g., VM 132 and app 143) within different LPARs (e.g., LPAR 104 and LPAR 108).

LPAR 104 includes VM 132 and VM 134 (each previously discussed in FIG. 1), and in one embodiment, fast path communication program 200 allocates (referring to FIG. 2, step 210) SM 404.

LPAR 108 includes app 141, app 142, and app 143 (each previously discussed in FIG. 1) and in one embodiment, fast path communication program 200 (referring to FIG. 2, step 210) allocates SM 408.

In one embodiment, proxy 401 and/or proxy 409 are proxy servers. In another embodiment, proxy 401 and/or proxy 409 are software constructs (e.g., applications, functions, services, etc.). In some embodiments, proxy 401 and/or proxy 409 are initiated by: hypervisor 118, communication module 160, and/or another system function of computing node 102 (each previously discussed in FIG. 1) when entities (e.g., VM 132 and VM 134) communicate data.

Network connections (NC), such as NC 400, NC 403, NC 410, and NC 411 are depicted by compound lines (i.e., two lines). In one embodiment, proxy 401 establishes and manages NC 400 and NC 403. In another embodiment, proxy 409 establishes and manages NC 410 and a portion of NC 411 connected to network 110. In some embodiments, proxy 409 may be associated with SEA 111 (previously discussed in FIG. 1). In other embodiments, proxy 409 utilizes SEA 111 to communicate with network 110.

In another embodiment, proxy 401 establishes and manages network connections (NC 400) among app 141, app 142, and app 143 of VM 140. In another embodiment, proxy 401 establishes and manages a network connection (NC 403) between VM 132 and VM 134 of LPAR 104. In a further embodiment, proxy 401 establishes and manages a network connection, comprised of NC 400 and NC 403, which enables communication of data between VM 132 and app 143. In some embodiments, a proxy (e.g., proxy 401) may establish and manage a plurality of network connections. The number and locations (e.g., within a VM, within an LPAR, between LPARs) of entities that may communicate data via a proxy may be affected by: the architecture of a computing node (e.g., computing node 102), a hypervisor of the computing node, and/or communication functions incorporated within the computing node. Similar considerations and/or constraints (e.g., the architecture of a computing node) may affect (e.g., limit the number) the SM buffers that are managed by a proxy.

Proxy 409 establishes and manages a network connection (NC 410) that enables client 180 to communicate among app 141, app 142, and app 143 via network 110. Client 180 exists external to computing node 102; therefore, proxy 409 cannot establish a shared memory buffer that enables client 180 to utilize a direct memory transfer protocol with any or all of app 141, app 142, and app 143.

In one embodiment, proxy 401 enables communication among app 141, app 142, and/or app 143 via a fast path communication solution (e.g., SharedVM_FPath) utilizing SM 408. SM 408 includes messaging pool buffer (MPB) 441, MPB 442, and MPB 443. Proxy 401 manages MPB 441 via read/write pointers pair (RWP) 451. Proxy 401 manages MPB 442 via RWP 452. In one example, app 141 communicates data to app 142 via MPB 441. In another example, app 142 communicates data to app 143 via MPB 442. In the current depiction, MPB 443 is allocated; however, MPB 443 is unused. In some embodiments, proxy 401 may manage a plurality of read pointers and write pointers pairs associated with RWP 451 and/or RWP 452. In an example, a plurality of read pointers and write pointers pairs enables a buffer (e.g., MPB 441) that communicates two or more data between app 141 and app 142. In one scenario, data communication may be unidirectional, such as from app 141 to app 142. In another scenario, data communication may be bidirectional, such as a first data is communicated (e.g., transferred) from app 141 to app 142, app 142 processes the communicated data, and app 142 communicates (e.g., returns) the results of the processed data to app 141. In various embodiments, proxy 401 may manage a plurality of read pointers and write pointers, which are shared by multiple servers that are associated with a memory buffer; and where the plurality of read pointers and write pointers are not constrained to exist as pairs.

In another embodiment, proxy 401 establishes and manages NC 403 between VM 132 and VM 134 of LPAR 104. In an example, fast path communication program 200 allocates SM 404, SM 404 may communicate data between VM 132 and VM 134 via a fast path communication solution (e.g., SharedOS_FPath). Proxy 401 manages RWP 414 for SM 404, which communicates data between VM 132 and VM 134.

In a further embodiment, proxy 401 establishes and manages NC 400 and NC 403 that enables communication between VM 132 of LPAR 104 and app 143 of VM 140, executing within LPAR 108. In an example, fast path communication program 200 allocates SM 402, which communicates data between VM 132 and app 143 via a fast path communication solution (e.g., SharedHypervisor_FPath). Proxy 401 manages RWP 412 for SM 402; SM 402 communicates data between VM 132 of LPAR 104 and app 143 of VM 140 executing within LPAR 108.

Figure 5:
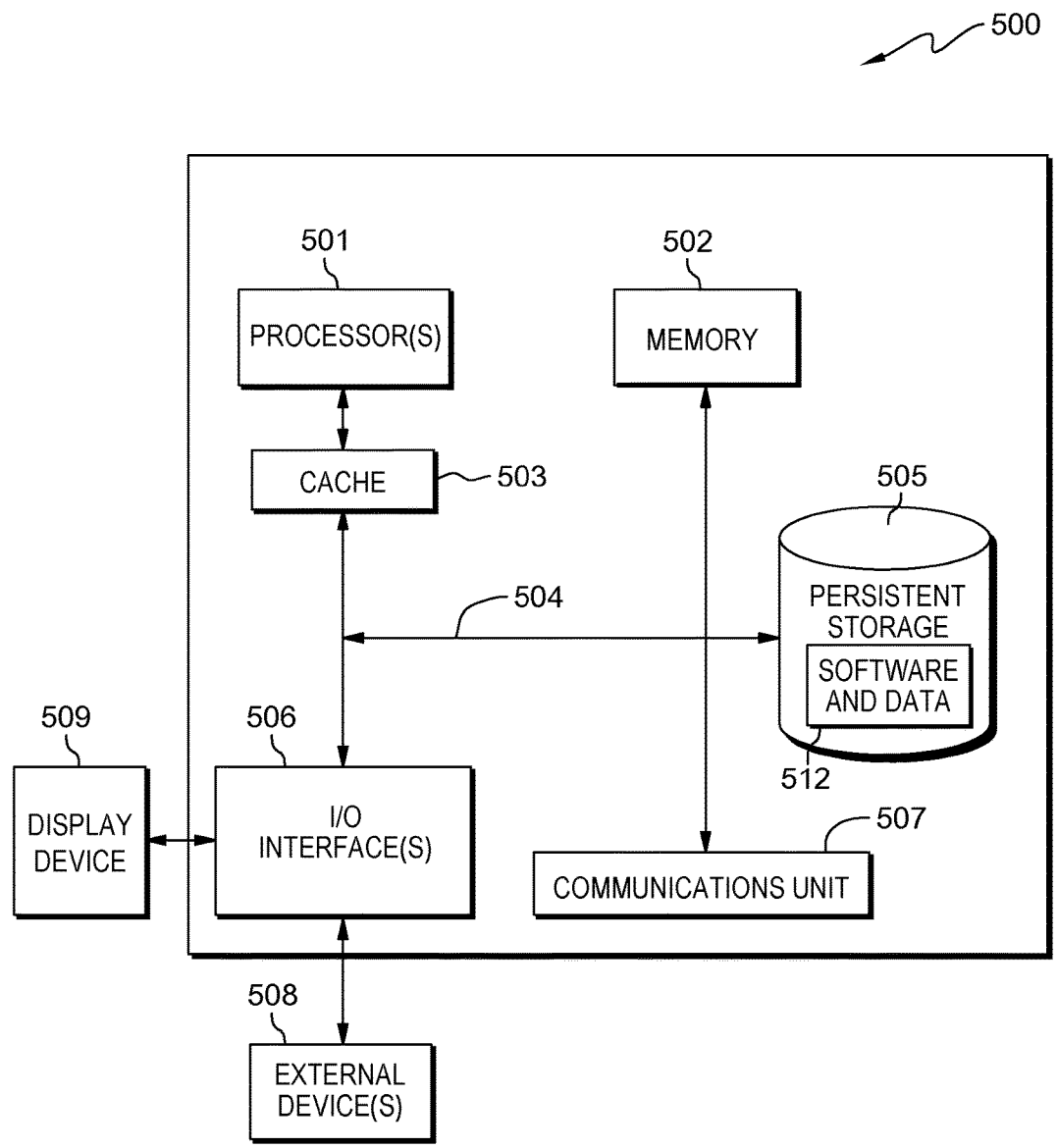
FIG. 5 depicts a block diagram of components of a computer, in accordance with an embodiment of the present invention.

FIG. 5 depicts computer system 500, which is representative of computing node 102 processors 120, and client 180. Computer system 500 is an example of a system that includes software and data 512. Computer system 500 includes processor(s) 501, cache 503, memory 502, persistent storage 505, communications unit 507, input/output (I/O) interface(s) 506, and communications fabric 504. Communications fabric 504 provides communications between cache 503, memory 502, persistent storage 505, communications unit 507, and input/output (I/O) interface(s) 506. Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processor(s) 501 by holding recently accessed data, and data near recently accessed data, from memory 502. With respect to computing node 102, memory 502 includes, at least in part, designated memory 126 (e.g., physical hardware) depicted in FIG. 1 to be shared among LPARs.

Program instructions and data used to practice embodiments of the present invention may be stored in persistent storage 505 and in memory 502 for execution by one or more of the respective processor(s) 501 via cache 503. In an embodiment, persistent storage 505 includes a magnetic hard disk drive. Alternatively, or in addition to a magnetic hard disk drive, persistent storage 505 can include a solid state hard drive, a semiconductor storage device, read-only memory (ROM), erasable programmable read-only memory (EPROM), flash memory, or any other computer readable storage media that is capable of storing program instructions or digital information. With respect to computing node 102, persistent storage 505 includes, at least in part, disks 122 (e.g., physical hardware) depicted in FIG. 1 to be shared among LPARs.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505. Software and data 512 are stored in persistent storage 505 for access and/or execution by one or more of the respective processor(s) 501 via cache 503 and one or more memories of memory 502. With respect to computing node 102, software and data 512 includes hypervisor 118, communication module 160, DMA proxy module 150, app 141, app 142, and app 143. In addition, DMA proxy module 150 includes fast path communication program 200, and data management program 300; DMA proxy module 150 may also include shareable memory functions and communication functions. With respect to communication module 160, software and data 512 may also include a garbage collector, one or more memory management functions (not shown), one or more look-up tables, and one or more global socket registry tables.

Communications unit 507, in these examples, provides for communications with other data processing systems or devices, including resources of computing node 102, processors 120, and client 180. In these examples, communications unit 507 includes one or more network interface cards. Communications unit 507 may provide communications through the use of either or both physical and wireless communications links. With respect to computing node 102, hypervisor 118, software and data 512, and program instructions and data, used to practice embodiments of the present invention may be downloaded to persistent storage 505 through communications unit 507. With respect to computing node 102, communications unit 507 includes, at least in part, one or more network cards 124 (e.g., physical hardware), shared Ethernet adapter (SEA) 111, and virtual adapters 112, 114, and 116 depicted in FIG. 1 to be shared among LPARs.

I/O interface(s) 506 allows for input and output of data with other devices that may be connected to each computer system. For example, I/O interface 506 may provide a connection to external devices 508, such as a keyboard, keypad, a touch screen, and/or some other suitable input device. External devices 508 can also include portable computer readable storage media such as, for example, thumb drives, portable optical or magnetic disks, and memory cards. Software and data used to practice embodiments of the present invention can be stored on such portable computer readable storage media and can be loaded onto persistent storage 505 via I/O interface(s) 506. I/O interface(s) 506 also connect to display device 509.

Display device 509 provides a mechanism to display data to a user and may be, for example, a computer monitor. Display device 509 can also function as a touch screen, such as the display of a tablet computer or a smartphone.

It is understood in advance that although this disclosure discusses system virtualization, implementation of the teachings recited herein are not limited to a virtualized computing environment. Rather, the embodiments of the present invention are capable of being implemented in conjunction with any type of clustered computing environment now known (e.g., cloud computing) or later developed.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code/instructions embodied thereon.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer system for communicating data utilizing direct memory access, the computer system comprising:
   one or more computer processors;
   one or more computer readable storage media; and
   program instructions stored on the computer readable storage media for execution by at least one of the one or more processors, the program instructions comprising:
   program instructions to establish a networking connection, using a proxy, between at least a first computing entity and a second computing entity, wherein the program instructions to establish the networking connection further comprises:
   program instructions to establish, utilizing the proxy, the network connection between the first computing entity and the second computing entity utilizing a transport layer of a network architecture, wherein establishing the network connection includes:
   program instructions to establish an socket secure (SOCKS) session, wherein the SOCKS session utilizes transmission control protocol (TCP);
   program instructions to redirect an invocation of a first set of one or more application programming interfaces (APIs) corresponding to the first computing entity and the second computing entity that transfer the data utilizing networking, to a second set of one or more APIs, wherein the second set of one or more APIs enables the direct memory access protocol;
   program instructions to determine a shared memory space for the established networking connection between at least the first computing entity and the second computing entity;
   program instructions to allocate the shared memory space from heap memory, wherein the program instructions to determine the shared memory space further comprises:
   program instructions to determine a relationship of the first computing entity and the second computing entity based at least in part on a corresponding first socket connection and a second socket connection within a global sockets registry table; and
   program instructions to allocate the shared memory space from the heap memory based, at least in part on the determined relationship of the first computing entity and the second computing entity;
   program instructions to transmit data over the established networking connection between at least the first computing entity and the second computing entity utilizing a direct memory access protocol and the allocated shared memory space, wherein the program instructions to transmit data over the established networking connection further comprises:
   program instructions to determine a write pointer and a read pointer pair corresponding to one or more memory addresses of the allocated shared memory space, wherein the one or more memory addresses are related to transmitted data;
   program instructions to modify the write pointer based, at least in part, on transmitting a first block of data, of the transmitted data, from the first computing entity to the allocated shared memory space, wherein the write pointer is modified utilizing the proxy; and
   program instructions to modify the read pointer based, at least in part, on transmitting a second block of data, of the transmitted data, from the allocated shared memory space to the second computing entity, wherein the read pointer is modified utilizing the proxy.

* * * * *